(12) United States Patent
Konno

(10) Patent No.: US 7,465,594 B2
(45) Date of Patent: Dec. 16, 2008

(54) ACTIVE-MATRIX ADDRESSING SUBSTRATE AND METHOD OF FABRICATING THE SAME

(75) Inventor: Takayuki Konno, Kanagawa (JP)

(73) Assignee: Nec LCD Technologies, Ltd., Kanagawa (JP)

( * ) Notice: Subject to any disclaimer, the term of this patent is extended or adjusted under 35 U.S.C. 154(b) by 136 days.

(21) Appl. No.: 11/435,031

(22) Filed: May 17, 2006

(65) Prior Publication Data

US 2006/0284178 A1   Dec. 21, 2006

(30) Foreign Application Priority Data

Jun. 17, 2005  (JP) .............................. 2005-177403

(51) Int. Cl.
*H01L 21/00* (2006.01)
(52) U.S. Cl. .............................. 438/30; 438/22; 438/24; 438/48; 257/E27.001; 257/E21.001
(58) Field of Classification Search .................. 438/30, 438/22, 24, 48; 257/79, 103, E21.001, E27.001
See application file for complete search history.

(56) References Cited

U.S. PATENT DOCUMENTS

2003/0214027 A1* 11/2003 Nishitani et al. ............ 257/700

FOREIGN PATENT DOCUMENTS

| JP | 2002-323706 | 11/2002 |
| JP | 2004-62145 | 2/2004 |
| JP | 2004-302448 | 10/2004 |
| JP | 2005-195927 | 7/2005 |

\* cited by examiner

*Primary Examiner*—Walter Lindsay, Jr.
*Assistant Examiner*—Abdulfattah Mustapha
(74) *Attorney, Agent, or Firm*—McGinn IP Law Group, PLLC

(57) ABSTRACT

An active-matrix addressing substrate improves the degradation of initial alignment of liquid-crystal molecules caused by the steps or level differences due to the pixel electrodes and/or the common electrode. The pixel electrodes are formed on or over the first insulating layer and the common electrode is formed on the second or third insulating layer. The second insulating layer has steps or level differences due to the pixel electrodes in their vicinities. The second insulating layer is made of a dielectric material having fluidity prior to hardening, e.g., an acrylic resin. The steps of the second insulating layer are relaxed, resulting in the gently sloping steps. The steps of an overlying alignment layer due to the common electrode slope gently as well. The thickness of the pixel electrodes, the thickness and inclination angle of the second insulating layer, and the thicknesses of the pixel and common electrodes are defined.

6 Claims, 15 Drawing Sheets

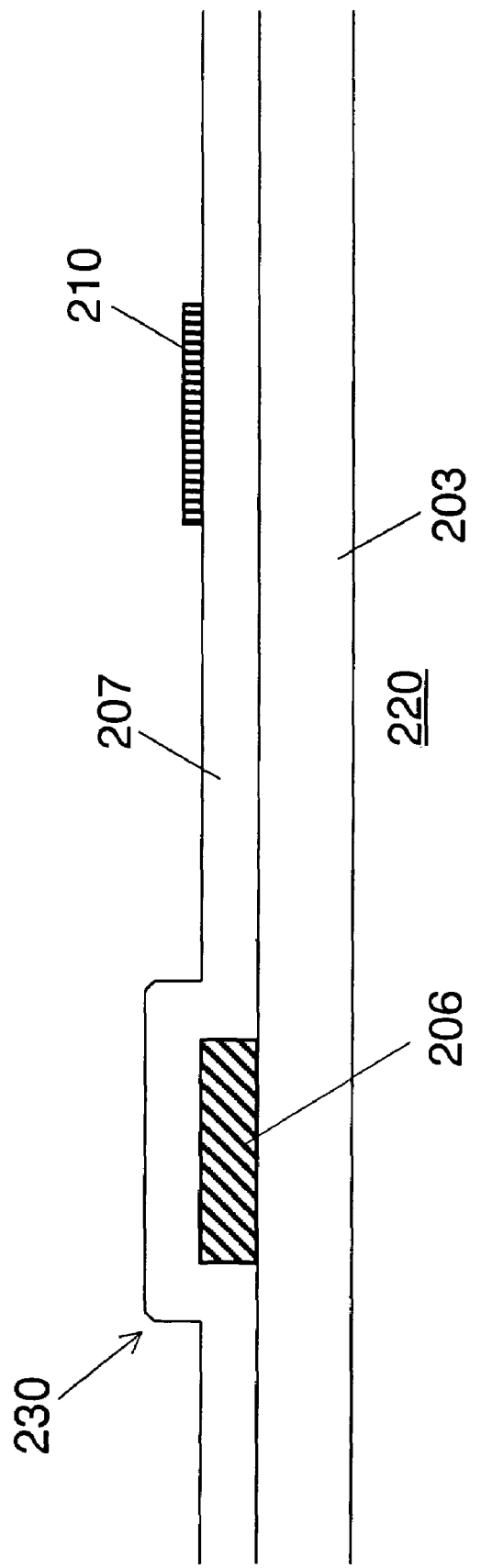

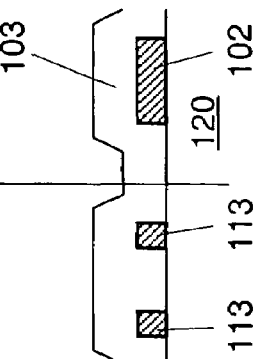
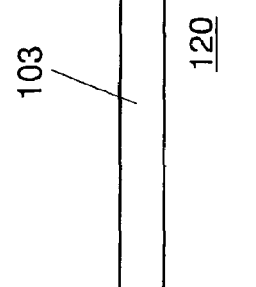
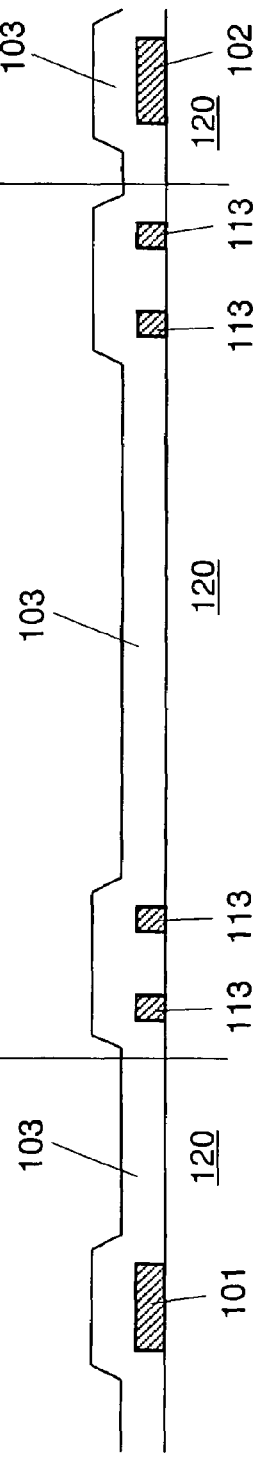

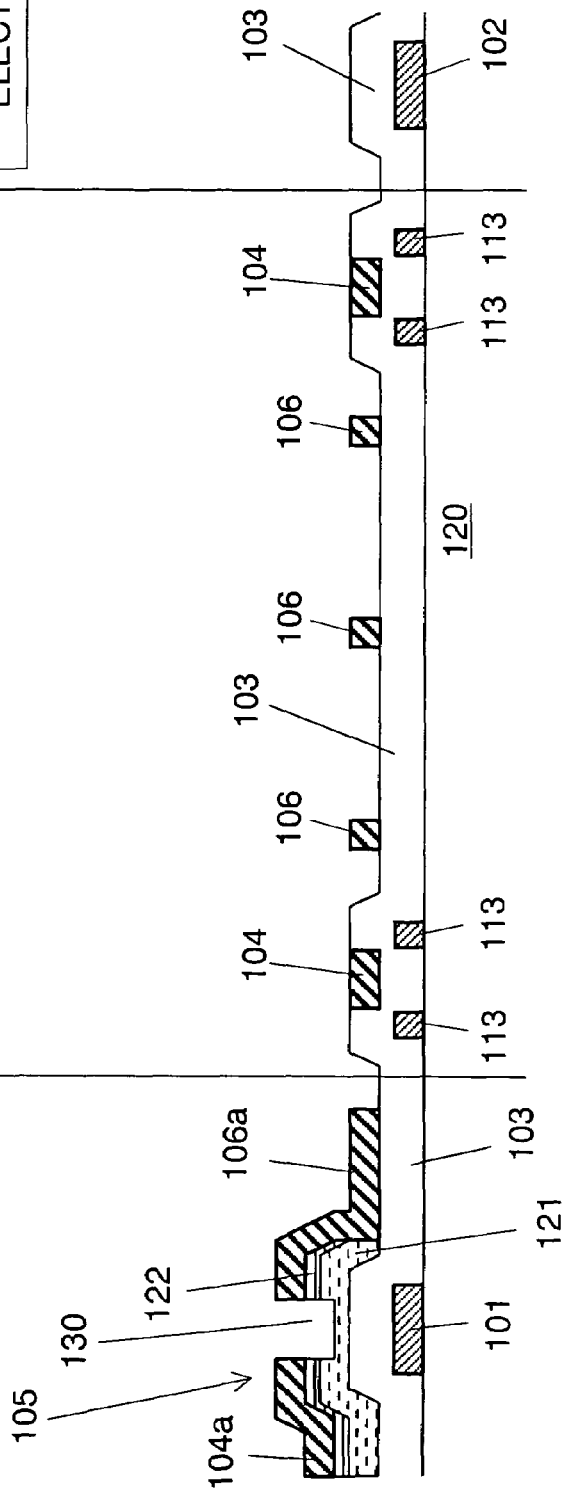

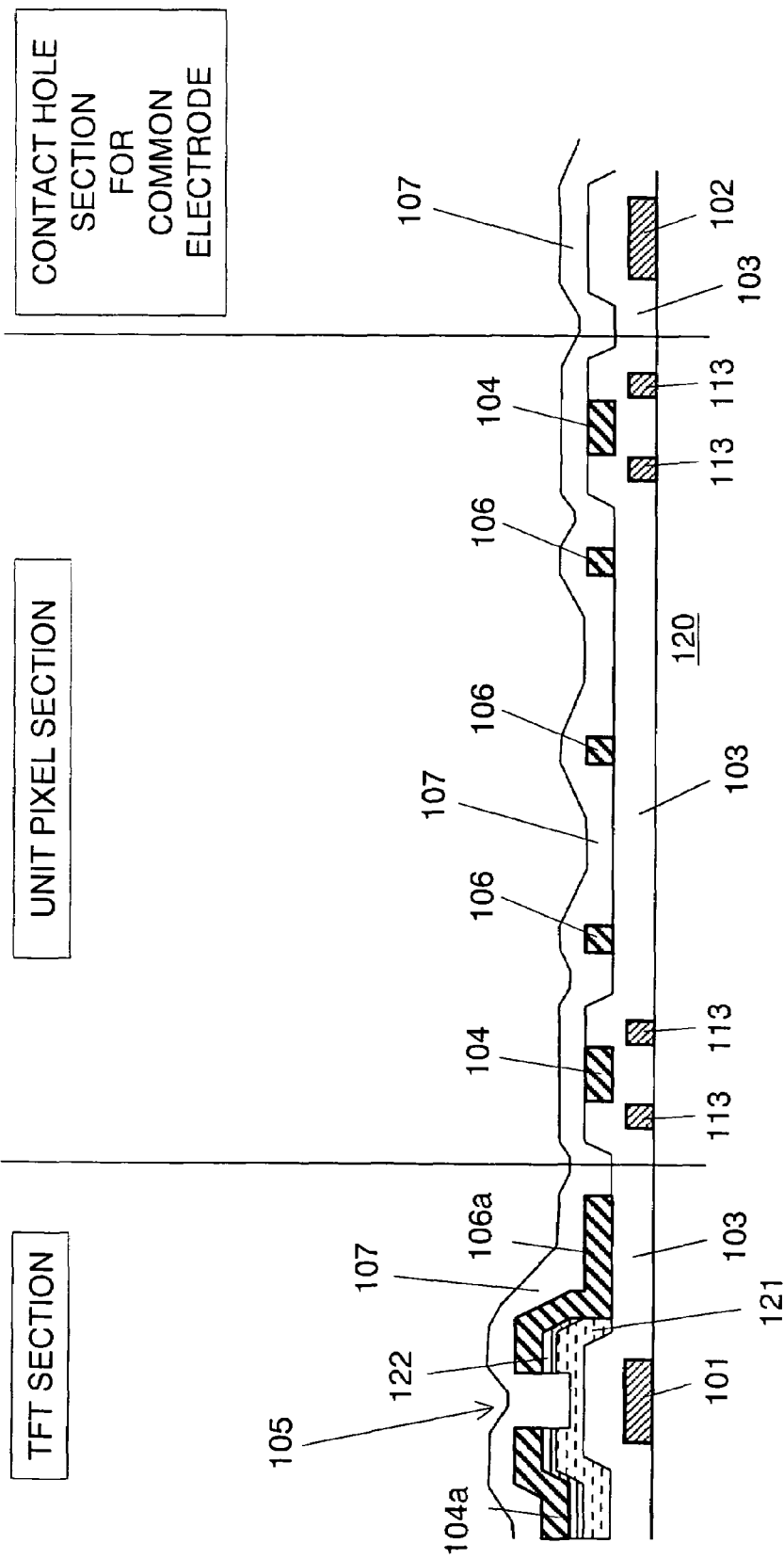

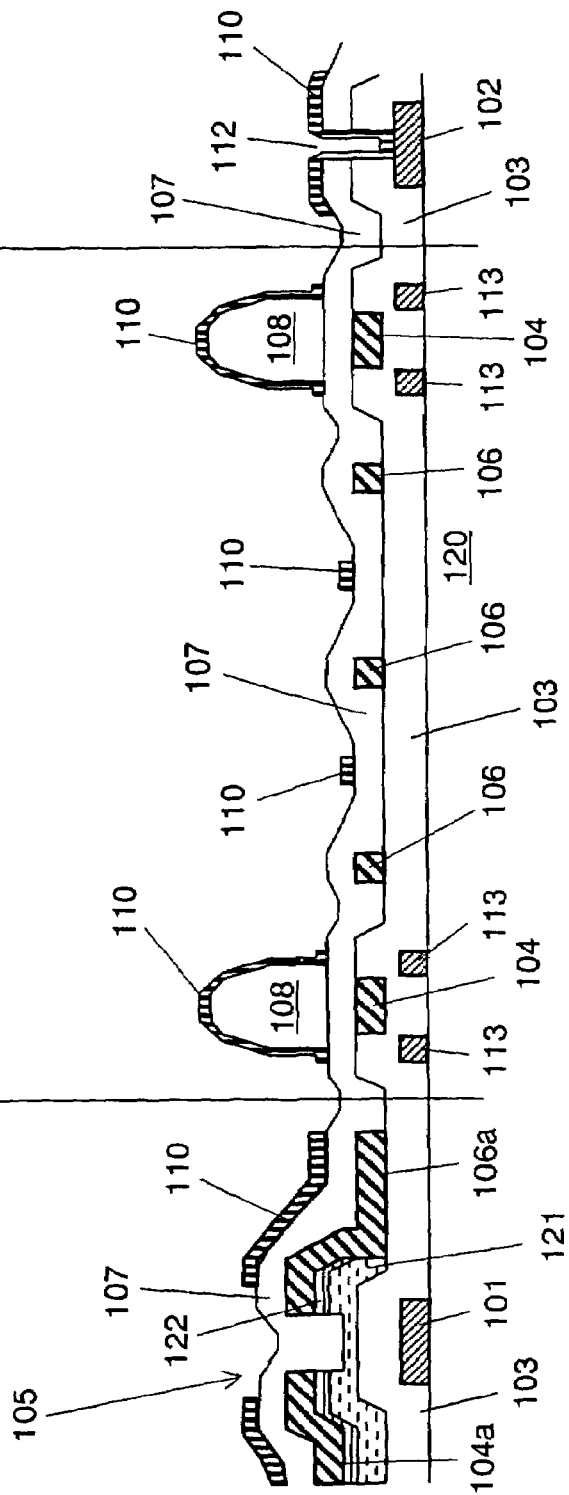

ACTIVE-MATRIX ADDRESSING SUBSTRATE AND METHOD OF FABRICATING THE SAME

BACKGROUND OF THE INVENTION

1. Field of the Invention

The present invention relates to an active-matrix addressing substrate and a method of fabricating the substrate and more particularly, to an active-matrix addressing substrate preferably used for an active-matrix addressing Liquid-Crystal Display (LCD) device using lateral electric field, and a method of fabricating the substrate.

2. Description of the Related Art

The TN (Twisted Nematic) type LCD device using vertical electric field, which has been extensively used in various fields, has an advantage of high contrast; however, it has a disadvantage that the viewing angle dependence is conspicuous because the axis of the liquid-crystal molecules is rotated to the direction perpendicular to the liquid crystal layer (i.e., an active-matrix addressing substrate and an opposite substrate) by applied vertical electric field.

Recently, there has been an increasing demand for the LCD device applicable to large-sized monitors such as television (TV). In response to this demand, the LCD device using lateral electric field, which is termed the "In-Plane Switching (IPS)" type, has been used more often than ever. The IPS type LCD device has an advantage that the viewing angle characteristics are much favorable compared with the conventional TN type LCD device. This is because, with the IPS type LCD device, the axis of the liquid-crystal molecules is rotated by lateral electric field in planes parallel to the active-matrix addressing substrate and the opposite substrate and therefore, the viewing angle dependence with respect to the rotation angle of the liquid-crystal molecule is eliminated.

Thus, the IPS type LCD device has better viewing angle characteristics than the TN type one. However, with the IPS type LCD device, the pixel electrode and the common electrode are comb-teeth shaped and arranged oppositely, and lateral electric field is applied across the pixel and common electrodes. For this reason, the pixel and common electrodes occupy a wider area in the display region than the TN type LCD device, which causes a problem that the aperture ratio is lowered.

As an solution to this problem, an active-matrix addressing substrate is disclosed in the Japanese Non-Examined Patent Publication No. 2002-323706 (page 20, column 38, line 32 to page 28, column 53, line 50, FIGS. 1 and 2), which may be termed the "first prior-art substrate" below. This prior-art substrate is shown in FIG. 1 and FIGS. 2A to 2C attached. FIG. 1 is a plan view of the first prior-art substrate. FIGS. 2A to 2C are partial cross-sectional views along the lines IIA-IIA, IIB-IIB, and IIC-IIC in FIG. 1, respectively. These figures show the structure of one of the pixel regions.

In this specification, the structure of one of the pixel regions arranged in a matrix array will be mainly explained for the sake of simplification of description, because each of the pixel regions has the same structure.

As shown in FIG. 1 and FIGS. 2A to 2C, the first prior-art substrate comprises scanning signal lines 301 and common signal lines 302, which are extended in parallel to each other on a surface of a transparent glass plate 320. These lines 301 and 302 are formed by patterning a first metal film. Part of each scanning signal line 301 serves as a gate electrode of a corresponding one of Thin-Film Transistors (TFTs) 305. A first insulating layer 303 is formed on the whole plate 320 to cover the lines 301 and 302.

On the first insulating layer 303, for each of the TFTs 305, a patterned amorphous silicon (a-Si) layer 321 and an n-type patterned a-Si layer 322 are formed in this order to be overlapped with a corresponding one of the scanning signal lines 301 in the TFT section. A source electrode 306. and a drain electrode 304a of the TFT 305 are formed to overlap with the corresponding one of the a-Si layers 322. Moreover, image signal lines 304 and auxiliary pixel electrodes 306a are formed on the first insulating layer 303 to extend perpendicular to the scanning signal lines 301 and the common signal lines 302. The image signal lines 304, the drain electrodes 304a, the source electrodes 306, and the auxiliary pixel electrodes 306a are formed by patterning a second metal film. The drain electrodes 304a are united with the corresponding image signal lines 304, respectively. The auxiliary pixel electrodes 306a are united with the corresponding source electrodes 306, respectively. A second insulating layer 307 is formed on the first insulating layer 303 to cover the image signal lines 304, the drain electrodes 304a, the source electrodes 306, and the auxiliary pixel electrodes 306a over the whole plate 320.

A third insulating layer 308, which is thick and transparent, is formed on the second insulating layer 307 over the whole plate 320. On the third insulating layer 308, pixel electrodes 309 and a common electrode 310 are formed by patterning a transparent, conductive material film. Each of the pixel electrodes 309 has comb-teeth-shaped parts. The common electrode 310 has comb-teeth-shaped parts. The comb-teeth-shaped parts of the electrodes 309 and 310 are engaged with each other, as shown in FIG. 1. The image signal lines 304 are entirely covered with the common electrode 310 by way of the second and third insulating layers 307 and 308.

The pixel electrodes 309 are contacted with the corresponding source electrodes 306 by way of corresponding contact holes 311, respectively. The common electrode 310 is contacted with the common signal lines 302 by way of corresponding contact holes 312, respectively. Therefore, the pixel electrodes 309 are electrically connected to the corresponding source electrodes 306, respectively. The common electrode 310 is electrically connected to the common signal lines 302.

With the first prior-art substrate, as described above, since the comb-teeth-shaped parts of the pixel electrodes 309 and those of the common electrode 310 are transparent, light penetrates the areas occupied by these comb-teeth-shaped parts in the pixel regions. Thus, the transmittance is raised. According to the result of the inventor's simulation, the effective aperture ratio will be raised by approximately 8%, where the contribution by these areas is considered.

Moreover, the image signal lines 304 are entirely overlapped or covered with the common electrode 310 and thus, the aperture of the pixel region can be expanded to the vicinity of the corresponding image signal lines 304. At the same time, leaked electric field from the lines 304 is shielded by the common electrode 310 and therefore, a disadvantage of longitudinal crosstalk is reduced.

In addition, because the third insulating layer 308 is located between the image signal lines 304 and the common electrode 310, a load capacitance is generated. However, by making the layer 308 with a dielectric material having a low dielectric constant, the value of the load capacitance can be suppressed within the permissible range for driving.

As another solution to the above-described problem, an active-matrix addressing substrate is disclosed in the Japanese Non-Examined Patent Publication No. 2004-302448 (page 15, line 8 to line 36, FIGS. 10 and 11), which may be termed the "second-art substrate" below. This prior-art substrate is shown in FIG. 3 and FIGS. 4A to 4C attached. FIG. 3 is a plan view of the second prior-art substrate. FIGS. 4A to 4C are partial cross-sectional views along the lines IVA-IVA, IVB-IVB, and IVC-IVC in FIG. 3, respectively. These figures show the structure of one of the pixel regions.

As shown in FIG. 3 and FIGS. 4A to 4C, the second prior-art substrate comprises scanning signal lines 401 and common signal lines 402, which are extended in parallel to each other on a surface of a transparent glass plate 420. These lines 401 and 402 are formed by patterning a first metal film. Part of each scanning signal line 401 serves as a gate electrode of a corresponding one of TFTs 405. A first insulating layer 403 is formed on the whole plate 420 to cover the lines 401 and 402.

On the first insulating layer 403, for each of the TFTs 405, a patterned a-Si layer 421 and an n-type patterned a-Si layer 422 are formed in this order to be overlapped with a corresponding one of the scanning signal lines 401 in the TFT section. A source electrode 406 and a drain electrode 404a of the TFT 405 are formed to overlap with the corresponding one of the a-Si layers 422. Moreover, image signal lines 404 and auxiliary pixel electrodes 406a are formed on the first insulating layer 403 to extend perpendicular to the scanning signal lines 401 and the common signal lines 402. The image signal lines 404, the drain electrodes 404a, the source electrodes 406, and the auxiliary pixel electrodes 406a are formed by patterning a second metal film. The drain electrodes 404a are united with the corresponding image signal lines 404, respectively. The auxiliary pixel electrodes 406a are united with the corresponding source electrodes 406, respectively. A second insulating layer 407 is formed on the first insulating layer 403 to cover the image signal lines 404, the drain electrodes 404a, the source electrodes 406, and the auxiliary pixel electrodes 406a over the whole plate 420.

A third insulating layer 408, which is thick, is selectively formed on the second insulating layer 407. The layer 408 is left to cover only the respective image signal lines 404. The cross section of the layer 408 is like banks that extend along the respective lines 404, as shown in FIG. 4B. Pixel electrodes 409 and a common electrode 410 are formed on the second or third insulating layer 407 or 408 by patterning a transparent, conductive material film. Each of the pixel electrodes 409 has comb-teeth-shaped parts. The common electrode 410 has comb-teeth-shaped parts. The comb-teeth-shaped parts of the electrodes 409 and 410 are engaged with each other, as shown in FIG. 3. The image signal lines 404 are entirely covered with the common electrode 410 by way of the second and third insulating layers 407 and 408.

The pixel electrodes 409 are contacted with the corresponding source electrodes 406 by way of corresponding contact holes 411, respectively. The common electrode 410 is contacted with the common signal lines 402 by way of corresponding contact holes 412, respectively. Therefore, the pixel electrodes 409 are electrically connected to the corresponding source electrodes 406, respectively. The common electrode 410 is electrically connected to the common signal lines 402.

As seen from the above explanation, the structure of the second prior-art substrate is the same as that of the above-described first prior-art substrate of FIG. 1 and FIGS. 2A to 2C, except that the third insulating layer 408 is selectively left in the form of banks on the second insulating layer 407, covering only the image signal lines 404. Thus, the effective aperture ratio of the second prior-art substrate is equivalent to that of the first prior-art substrate.

Moreover, with the second prior-art substrate, the third insulating layer 408 is not left in the aperture of the pixel region and therefore, a colored dielectric material may be used for the layer 408. Since colored dielectric materials such as organic material (e.g., novolac resin) are obtainable at a low cost, an equivalent performance can be realized at a lower cost than the first prior-art substrate. On the other hand, with the first prior-art substrate, the third insulating layer 408 must be transparent because the layer 408 is formed over the whole glass plate 420. The cost of transparent dielectric materials is higher than that of colored dielectric material, raising the cost of the substrate itself.

As still another solution to the above-described problem, an active-matrix addressing substrate is disclosed in the Japanese Non-Examined Patent Publication No. 2004-062145 (page 26, line 42 to page 27, line 15, FIG. 23), which may be termed the "third prior-art substrate" below. This prior-art substrate is shown in FIG. 5 and FIGS. 6A to 6C attached. FIG. 5 is a plan view of the third prior-art substrate. FIGS. 6A to 6C are partial cross-sectional views along the lines VIA-VIA, VIB-VIB, and VIC-VIC in FIG. 5, respectively. These figures show the structure of one of the pixel regions.

As shown in FIG. 5 and FIGS. 6A to 6C, the third prior-art substrate comprises scanning signal lines 501 and common signal lines 502, which are extended in parallel to each other on a surface of a transparent glass plate 520. These lines 501 and 502 are formed by patterning a first metal film. Part of each scanning signal line 501 serves as a gate electrode of a corresponding one of TFTs 505. A first insulating layer 503 is formed on the whole plate 520 to cover the lines 501 and 502.

On the first insulating layer 503, for each of the TFTs 505, a patterned a-Si layer 521 and an n-type patterned a-Si layer 522 are formed in this order to be overlapped with a corresponding one of the scanning signal lines 501 in the TFT section. A source electrode 506a and a drain electrode 504a of the TFT 505 are formed to overlap with the corresponding one of the a-Si layers 522. Moreover, image signal lines 504 are formed on the first insulating layer 503 to extend perpendicular to the scanning signal lines 501 and the common signal lines 502. The image signal lines 504, the drain electrodes 504a, the pixel electrodes 506, and the source electrodes 506a are formed by patterning a second metal film. The drain electrodes 504a are united with the corresponding image signal lines 504, respectively. The source electrodes 506a are united with the corresponding pixel electrodes 506, respectively. A second insulating layer 507 is formed on the first insulating layer 503 to cover the image signal lines 504, the drain electrodes 504a, the pixel electrodes 506, and the source electrodes 506a over the whole plate 520. Since the pixel electrodes 506 are united with the corresponding source electrodes 506a, contact holes for electrically connecting the pixel electrodes 506 to the corresponding source electrodes 506a are unnecessary.

A third insulating layer 508, which is thick, is selectively formed on the second insulating layer 507. The layer 508 is left to cover only the respective image signal lines 504. The cross section of the layer 508 is like banks that extend along the respective lines 504, as shown in FIG. 6B. A common electrode 510 is formed on the second or third insulating layer 507 or 508 by patterning a transparent, conductive material film. Like the first and second prior-art substrates, each of the pixel electrodes 506 has comb-teeth-shaped parts, and the common electrode 510 has comb-teeth-shaped parts also. The image signal lines 504 are entirely covered with the common electrode 510 by way of the second and third insulating layers 507 and 508.

Similar to the second prior-art substrate, the third insulating layer 508 may be formed by a colored or transparent dielectric material.

The common electrode 510 is contacted with the common signal lines 502 by way of corresponding contact holes 512, respectively. Therefore, the common electrode 510 is electrically connected to the common signal lines 502.

With the third prior-art substrate of FIG. 5 and FIGS. 6A to 6C, similar to the second prior-art substrate, the third insulating layer 508 is selectively left to cover only the respective image signal lines 504 and has a cross section like banks. This is to lower the driving voltage by way of reduction of the load capacitance. Specifically, since the pixel electrodes 506 and the common electrode 510 are formed on the first and second insulating layers 503 and 507, respectively, these comb-teeth-shaped parts of the electrodes 506 and 510 are located on different levels. Thus, if the third insulating layer 508 is formed over the glass plate 520, the driving voltage will be too high. Accordingly, the third insulating layer 508 is selectively left to cover only the image signal lines 504.

Furthermore, like the second prior-art substrate, the image signal lines 504 are entirely overlapped or covered with the common electrode 510 and thus, the aperture of the pixel region can be expanded to the vicinity of the corresponding image signal lines 504. At the same time, because the image signal lines 504 are approximately surrounded by in cross section by the common electrode 510 like the second prior-art substrate, the obtainable function of shielding the leaked electric field from the image signal lines 504 is enhanced compared with the first prior-art substrate. According to the inventor's experiment, to effectively shield the leaked electric field from the image signal lines 504, it is sufficient that the common electrode 510 has a lateral projection width of 4 µm from an edge of the corresponding image signal line 504.

With the third prior-art substrate, as described above, the count of contact holes is decreased by one, and the lateral projection width of the common electrode 510 from an edge of the corresponding image signal line 504 is reduced. Therefore, a higher aperture ratio is obtainable than the second prior-art substrate.

Moreover, since the pixel electrodes 506 are formed by conductive metal, contribution to the transmittance is lowered. However, according to the result of the inventor's simulation, the effective aperture ratio will be raised by approximately 5%. As a result, the effective aperture ratio will be higher than the first and second prior-art substrates in total. A disadvantage of longitudinal crosstalk can be suppressed also.

As explained above, as seen from the second and third prior-art substrates, by selectively leaving the bank-shaped third insulating layer 407 or 507 intervening between the image signal lines 404 or 504 and the common electrode 410 or 510 to cover only the image signal lines 404 or 504, lower fabrication cost and higher aperture ratio than those of the first prior-art substrate can be realized.

However, if the banks-shaped third insulating layer 407 or 507 is selectively left to cover only the image signal lines 404 or 504 to raise the performance of increasing the aperture ratio, large steps (i.e., large differences in level) are likely to be formed in the vicinities of the image signal lines 404 or 504. These large steps will generate non-uniformity of the rubbing directions, which disturbs the initial alignment of liquid-crystal molecules. This is observable as optical leakage in the vicinities of the steps when black is displayed. Since the IPS type LCD device is driven in the normally black mode, the said disturbance of the initial alignment will be a cause of optical leakage near the steps of the third insulating layer 407 or 507, raising the black luminance and lowering the contrast.

As a solution of this problem, an active-matrix addressing substrate was created and filed on Jan. 8, 2004 as the Japanese Patent Application No. 2004-002782 (which corresponds to the Japanese Non-Examined Patent Publication No. 2005-195927)(FIGS. 1 and 2 and their corresponding explanation), which may be termed the "first related-art substrate" below. This related-art substrate is shown in FIG. 7 and FIGS. 8A to 8C attached. FIG. 7 is a plan view of the first related-art substrate. FIGS. 8A to 8C are partial cross-sectional views along the lines VIIIA-VIIIA, VIIIB-VIIIB, and VIIIC-VIIIC in FIG. 7, respectively. These figures show the structure of one of the pixel regions.

The structure of the first related-art substrate is the same as that of the third prior-art substrate of FIG. 5 and FIGS. 6A to 6C except that light-shielding electrodes 613 are additionally provided in the vicinities of respective image signal lines 604 on the same level as signal lines 601 and common signal lines 602.

Specifically, as shown in FIG. 7 and FIGS. 8A to 8C, the first related-art substrate comprises scanning signal lines 601 and common signal lines 602, which are extended in parallel to each other on a surface of a transparent glass plate 620. These lines 601 and 602 are formed by patterning a first metal film. Part of each scanning signal line 601 serves as a gate electrode of a corresponding one of TFTs 605.

On the glass plate 620, a pair of linear light-shielding electrodes 613 is additionally provided in the vicinity of each of the image signal lines 604. The electrodes 613, which are formed to extend along the said line 604, may be electrically connected to the corresponding common signal lines 602 or electrically isolated from other electrodes. Since the light-shielding electrodes 613 are located on the plate 620, the electrodes 613 are on the same level as the signal lines 601 and the common signal lines 602. The light-shielding electrodes 613 are formed by patterning the first metal film for the signal lines 601 and the common signal lines 602.

A first insulating layer 603 is formed on the whole plate 620 to cover the scanning signal lines 601, the common signal lines 602, and the light-shielding electrodes 613.

On the first insulating layer 603, for each of the TFTs 605, a patterned a-Si layer 621 and an n-type patterned a-Si layer 622 are formed in this order to be overlapped with a corresponding one of the scanning signal lines 601 in the TFT section. A source electrode 606a and a drain electrode 604a of the TFT 605 are formed to overlap with the corresponding one of the a-Si layers 622.

Image signal lines 604 are formed to be buried in the first insulating layer 603 to extend perpendicular to the scanning signal lines 601 and the common signal lines 602. The image signal lines 604, the drain electrodes 604a, the pixel electrodes 606, and the source electrodes 606a are formed by patterning a second metal film. The drain electrodes 604a are united with the corresponding image signal lines 604, respectively. The source electrodes 606a are united with the corresponding pixel electrodes 606, respectively.

A second insulating layer 607 is formed on the first insulating layer 603 to cover the image signal lines 604, the drain electrodes 604a, the pixel electrodes 606, and the source electrodes 606a over the whole plate 620. Since the pixel electrodes 606 are united with the corresponding source electrodes 606a, contact holes for electrically connecting the pixel electrodes 606 to the corresponding source electrodes 606a are unnecessary.

A third insulating layer 608, which is thick, is selectively formed on the second insulating layer 607. The third insulating layer 608 is left to cover only the respective image signal lines 604. The cross section of the layer 608 is like banks that extend along the respective lines 604, as shown in FIG. 8B. A common electrode 610 is formed on the second or third insulating layer 607 or 608 by patterning a transparent, conductive material film. Like the first and second prior-art substrates, each of the pixel electrodes 609 has comb-teeth-shaped parts, and the common electrode 610 has comb-teeth-shaped parts also. The image signal lines 604 are entirely covered with the common electrode 610 by way of the second and third insulating layers 607 and 608.

The common electrode 610 is contacted with the common signal lines 602 by way of corresponding contact holes 612, respectively. Therefore, the common electrode 610 is electrically connected to the common signal lines 602.

With the first related-art substrate of FIG. 7 and FIGS. 8A to 8C, the light-shielding electrodes 613 are additionally provided in the vicinity of each of the image signal lines 604 on the same level as signal lines 601 and common signal lines 602. Therefore, optical leakage due to the steps (i.e., level difference) near the image signal lines 604 can be prevented and thus, the raising of the black luminance and the lowering of the contrast can be suppressed.

The light-shielding electrodes 613 may be electrically connected to the corresponding common signal lines 602 or electrically isolated (i.e., electrically floating) from other electrodes. Moreover, the electrodes 613 may be located at one side or both sides of each image signal line 604, where these two arrangements are selected according to the layout of the pixels.

In this way, optical leakage due to the steps (i.e., level difference) of the third insulating layer 608 near the image signal lines 604 can be prevented by the light-shielding electrodes 613 and thus, the raising of the black luminance and the lowering of the contrast can be suppressed. However, the inventor found that the effect by the thickness of the pixel electrodes 610 is unable to be ignored when the pixel electrodes 610 are formed by metal.

FIG. 10 schematically shows the cross section of the aperture of the pixel region in the first related-art substrate of FIG. 7 and FIGS. 8A to 8C. As shown in FIG. 10, when a silicon nitride (which is a popular material) is deposited on a first insulating layer 203 by a CVD (Chemical Vapor Deposition) process as a second insulating layer 207 after a pixel electrode 206 is formed on the first insulating layer 203, the layer 207 will be formed to have a step (i.e., level difference) 230 corresponding to the step caused by the pixel electrode 206. Since the step 230 of the layer 207 is steep, it generates non-uniformity of the rubbing directions, causing optical leakage in the state of displaying black near the step 230. As a result, the problem that the black luminance is raised and the contrast is lowered is left unsolved.

In FIG. 10, the reference numerals 210 and 220 denote a common electrode and a transparent glass plate, respectively.

On the other hand, if the thickness of the pixel electrode 206 is decreased to reduce the inter-level distance of the step 230, the thickness of the image signal line (not shown in FIG. 10) will be reduced. This is because the pixel electrode 206 and the image signal line are formed by patterning the same metal film. Therefore, there arises another problem that the image signal to be written into the corresponding pixel by way of the image signal line will be delayed.

Moreover, similar to the third prior-art substrate and the first related-art substrate, with the structure that the common electrode 210 is located above the pixel electrode 206 by way of the intervening second insulating layer 207, the thickness of the alignment layer (which is located over the common electrode 210) is likely to be non-uniform due to the steps of the common electrode 210. As a result, the initial alignment of liquid-crystal molecules by rubbing operation will degrade, thereby causing a similar problem to the above-identified problem caused by the step 230 of the pixel electrode 206.

SUMMARY OF THE INVENTION

The present invention was created in consideration of the above-described problems.

A main object of the present invention is to provide an active-matrix addressing substrate that improves the degradation of initial alignment of liquid-crystal molecules caused by the steps (differences in level) of the pixel electrodes and/or the common electrode, and a method of fabricating the substrate.

Another object of the present invention is to provide an active-matrix addressing substrate that suppresses the optical leakage in the state of displaying black to realize higher contrast and higher uniformity, and a method of fabricating the substrate.

The above objects together with others not specifically mentioned will become clear to those skilled in the art from the following description.

According to a first aspect of the present invention, an active-matrix addressing substrate is provided, which comprises a transparent plate;

scanning signal lines and common signal lines formed on or over the plate;

a first insulating layer formed on or over the plate to cover the scanning signal lines and common signal lines;

image signal lines and pixel electrodes formed on the first insulating layer;

a second insulating layer formed on the first insulating layer to cover the image signal lines and the pixel electrodes;

a patterned third insulating layer formed on the second insulating layer to selectively cover the image signal lines; and a common electrode formed on the third insulating layer;

wherein the second insulating layer is made of a dielectric material having fluidity prior to hardening.

With the active-matrix addressing substrate according to the first aspect of the present invention, the pixel electrodes are formed on or over the first insulating layer and the common electrode is formed on the third insulating layer. Therefore, the pixel electrodes and the common electrode are located on different levels, where the second insulating layer has steps or level difference due to the pixel electrodes in their vicinities.

However, the second insulating layer is made of a dielectric material having luidity prior to hardening. Thus, the steps of the second insulating layer are effectively suppressed or relaxed, which means that the steps of the second insulating layer slope gently.

Moreover, since the steps of the second insulating layer slope gently, the steps of an overlying alignment layer due to the common electrode will slope gently as well.

As a result, the degradation of initial alignment of liquid-crystal molecules caused by the steps due to the pixel electrodes and/or the common electrode is improved. In addition, because of the same reason, the optical leakage in the state of displaying black is suppressed and therefore, higher contrast and higher uniformity can be realized.

According to a second aspect of the present invention, another active-matrix addressing substrate is provided, which comprises a transparent plate;

scanning signal lines, common signal lines, and light-shielding electrodes formed on or over the plate;

a first insulating layer formed on or over the plate to cover the scanning signal lines, the common signal lines, and the light-shielding electrodes;

image signal lines formed on or in the first insulating layer to be overlapped with the corresponding light-shielding electrodes;

pixel electrodes formed on the first insulating layer;

a second insulating layer formed on the first insulating layer to cover the image signal lines, the pixel electrodes, and the light-shielding electrodes;

a patterned third insulating layer formed on the second insulating layer to selectively cover the image signal lines; and a common electrode formed on the third insulating layer;

wherein the second insulating layer is made of a dielectric material having fluidity prior to hardening.

The substrate according to the second aspect of the invention corresponds to one obtained by adding the light-shielding electrodes to the substrate according to the first aspect of the invention.

With the active-matrix addressing substrate according to the second aspect of the present invention, the pixel electrodes are formed on or over the first insulating layer and the common electrode is formed on the third insulating layer. Therefore, the pixel electrodes and the common electrode are located on different levels, where the second insulating layer has steps or level difference due to the pixel electrodes in their vicinities.

However, the second insulating layer is made of a dielectric material having fluidity prior to hardening. Thus, the steps of the second insulating layer are effectively suppressed or relaxed, which means that the steps of the second insulating layer slope gently.

Moreover, since the steps of the second insulating layer slope gently, the steps of an overlying alignment layer due to the common electrode will slope gently as well.

As a result, the degradation of initial alignment of liquid-crystal molecules caused by the steps due to the pixel electrodes and/or the common electrode is improved. In addition, because of the same reason, the optical leakage in the state of displaying black is suppressed and therefore, higher contrast and higher uniformity can be realized.

In a preferred embodiment of the substrate according to the first or second aspect of the present invention, the dielectric material having fluidity prior to hardening is an acrylic resin.

In another preferred embodiment of the substrate according to the first or second aspect of the present invention, the second insulating layer is approximately equal to or greater than in thickness the pixel electrodes, and has a thickness of approximately 300 nm or less at its flat or even position, or has an inclination angle of approximately 30° or less near the respective pixel electrodes.

In still another preferred embodiment of the substrate according to the first or second aspect of the present invention, the pixel electrodes are made of a non-transparent, conductive material and have a thickness of approximately 200 nm or greater.

In a further preferred embodiment of the substrate according to the first or second aspect of the present invention, the common electrode is made of a transparent, conductive material and has a thickness of approximately 50 nm or less.

According to a third aspect of the present invention, a method of fabricating an active-matrix addressing substrate is provided, which comprises the steps of forming scanning signal lines and common signal lines on or over a transparent plate;

forming a first insulating layer on or over the plate to cover the scanning signal lines and common signal lines;

forming image signal lines and pixel electrodes on the first insulating layer;

forming a second insulating layer on the first insulating layer to cover the image signal lines and the pixel electrodes;

forming a patterned third insulating layer on the second insulating layer to selectively cover the image signal lines; and forming a common electrode on the second or third insulating layer;

wherein the second insulating layer is formed by using a dielectric material having fluidity prior to hardening.

With the method according to the third aspect of the present invention, it is apparent that the active-matrix addressing substrate according to the first aspect of the invention is fabricated.

According to a fourth aspect of the present invention, another method of fabricating an active-matrix addressing substrate is provided, which comprises the steps of forming scanning signal lines, common signal lines, and light-shielding electrodes on or over a transparent plate;

forming a first insulating layer on or over the plate to cover the scanning signal lines, the common signal lines, and the light-shielding electrodes;

forming image signal lines on or in the first insulating layer to be overlapped with the corresponding light-shielding electrodes;

forming pixel electrodes on the first insulating layer;

forming a second insulating layer on the first insulating layer to cover the image signal lines, the pixel electrodes, and the light-shielding electrodes;

forming a patterned third insulating layer on the second insulating layer to selectively cover the image signal lines; and forming a common electrode on the third insulating layer;

wherein the second insulating layer is made of a dielectric material having fluidity prior to hardening.

With the method according to the fourth aspect of the present invention, it is apparent that the active-matrix addressing substrate according to the second aspect of the invention is fabricated.

In a preferred embodiment of the method according to the third or fourth aspect of the present invention, the dielectric material having fluidity prior to hardening is an acrylic resin.

BRIEF DESCRIPTION OF THE DRAWINGS

In order that the present invention may be readily carried into effect, it will now be described with reference to the accompanying drawings.

FIG. 10 is a schematic cross-sectional view showing the aperture of the pixel region of the first related-art active-matrix addressing substrate shown in FIG. 7 and FIGS. 8A to 8C.

FIGS. 11A to 11C are partial cross-sectional views along the lines XIVA-XIVA, XIVB-XIVB, and XIVC-XIVC in FIG. 15, respectively, which show the step of a fabrication method of the active-matrix addressing substrate according to a first embodiment of the invention.

FIGS. 12A to 12C are partial cross-sectional views along the lines XIVA-XIVA, XIVB-XIVB, and XIVC-XIVC in FIG. 15, respectively, which show the subsequent step of the fabrication method of the active-matrix addressing substrate according to the first embodiment of the invention.

FIGS. 13A to 13C are partial cross-sectional views along the lines XIVA-XIVA, XIVB-XIVB, and XIVC-XIVC in FIG. 15, respectively, which show the subsequent step of the fabrication method of the active-matrix addressing substrate according to the first embodiment of the invention.

FIGS. 14A to 14C are partial cross-sectional views along the lines XIVA-XIVA, XIVB-XIVB, and XIVC-XIVC in FIG. 15, respectively, which show the subsequent step of the fabrication method of the active-matrix addressing substrate according to the first embodiment of the invention.

DETAILED DESCRIPTION OF THE PREFERRED EMBODIMENTS

Figure 1:
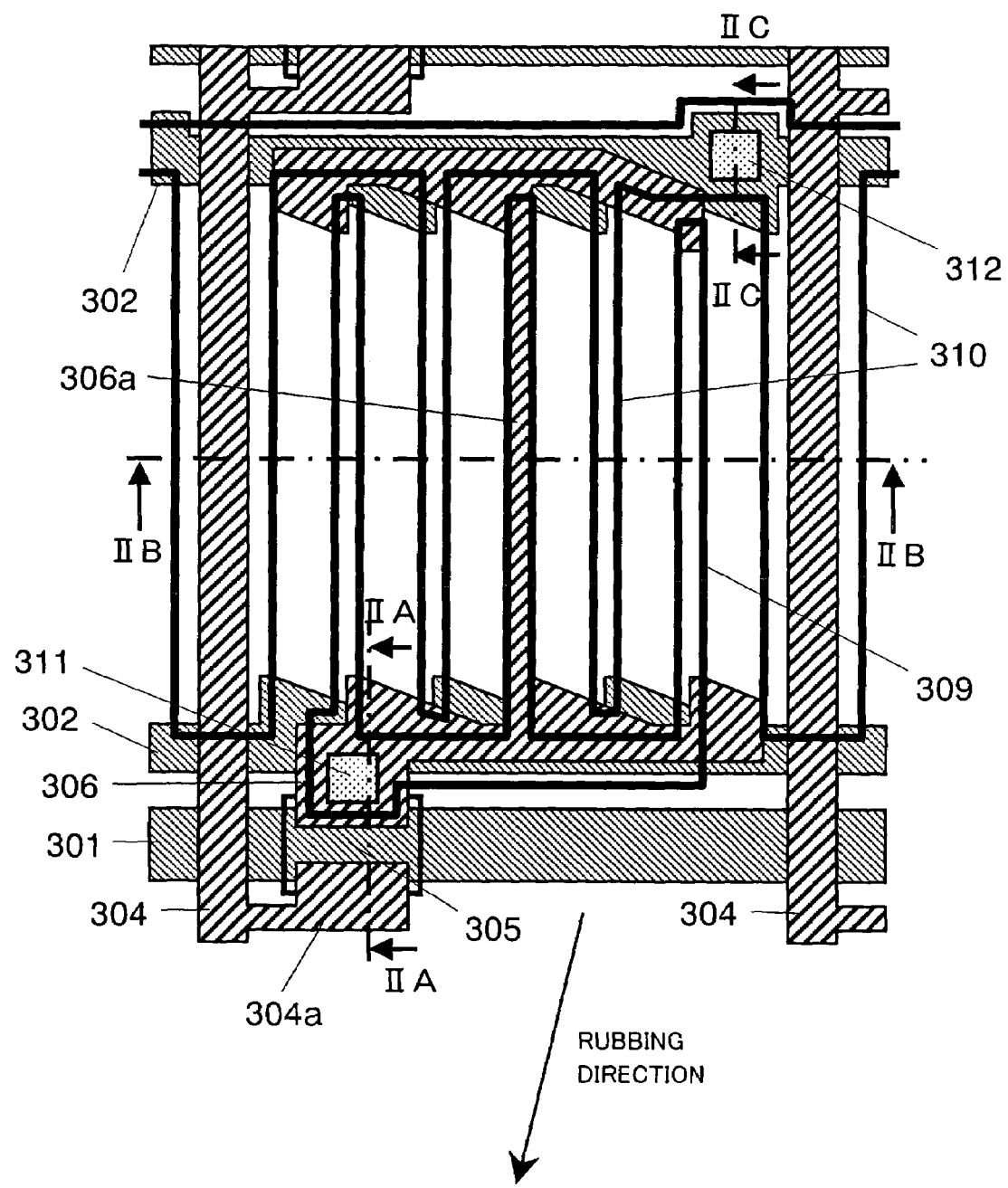
FIG. 1 is a plan view of a first prior-art active-matrix addressing substrate.
Figure 2:
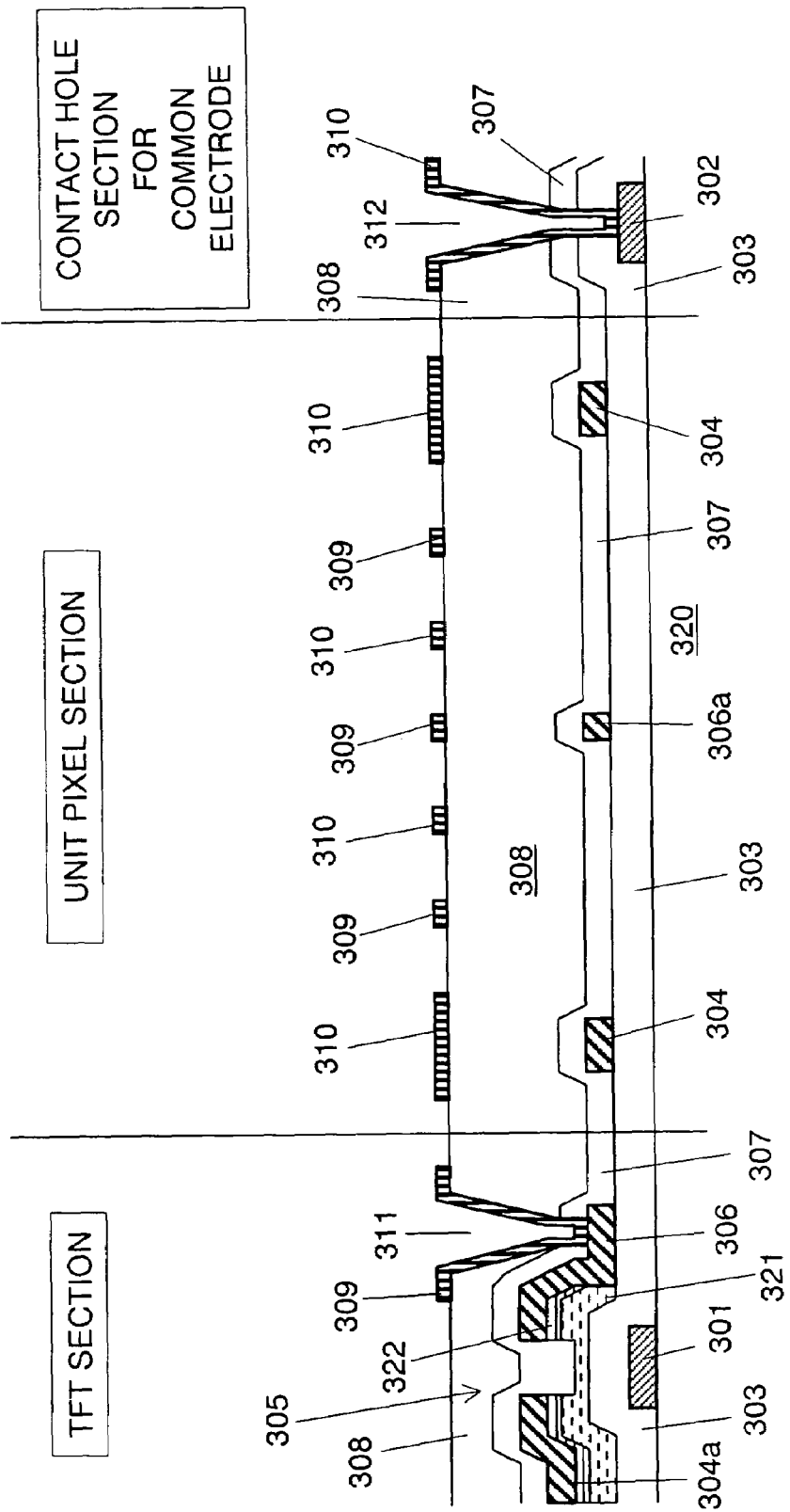
FIGS. 2A to 2C are partial cross-sectional views along the lines IIA-IIA, IIB-IIB, and IIC-IIC in FIG. 1, respectively.
Figure 3:
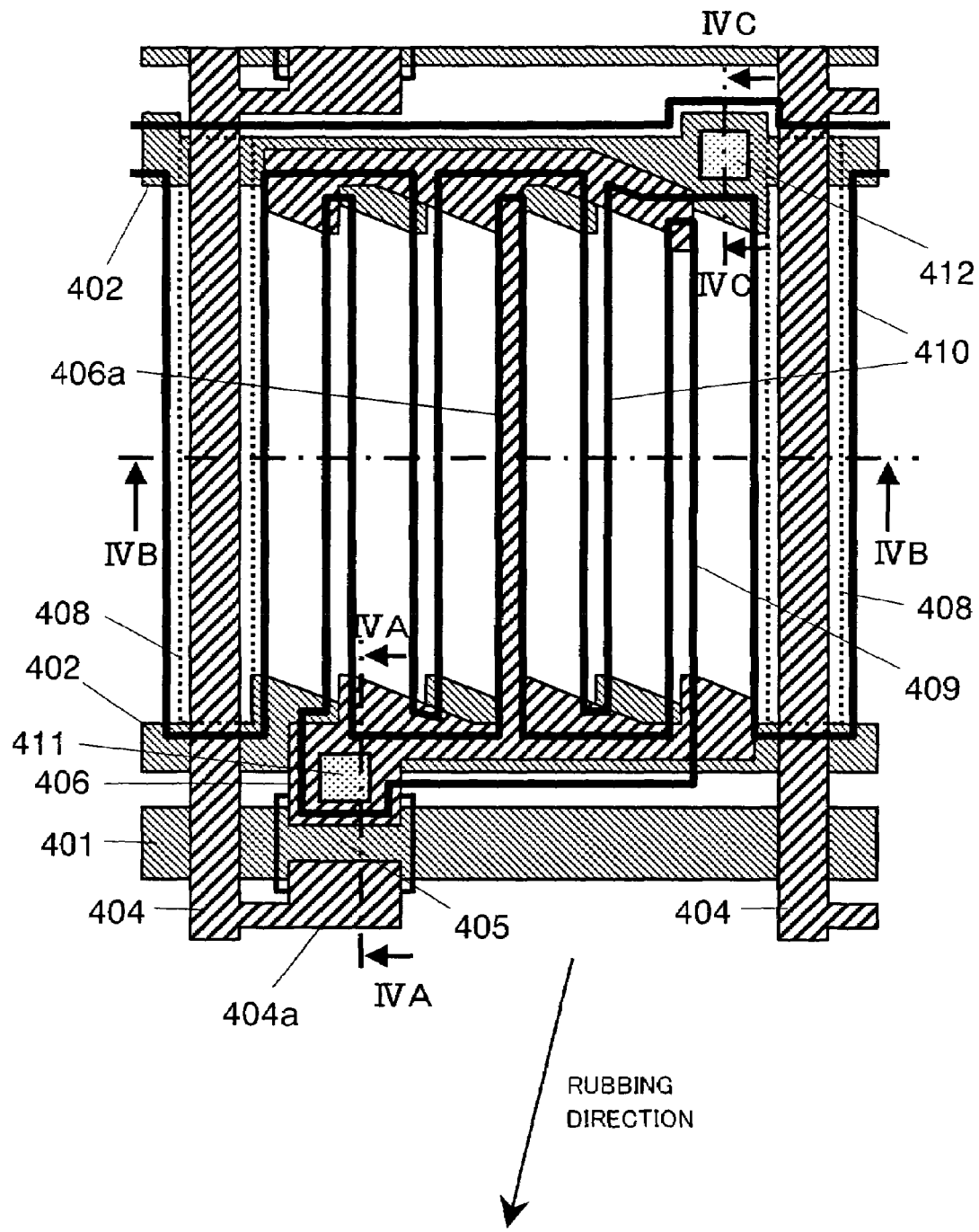
FIG. 3 is a plan view of a second prior-art active-matrix addressing substrate.
Figure 4:
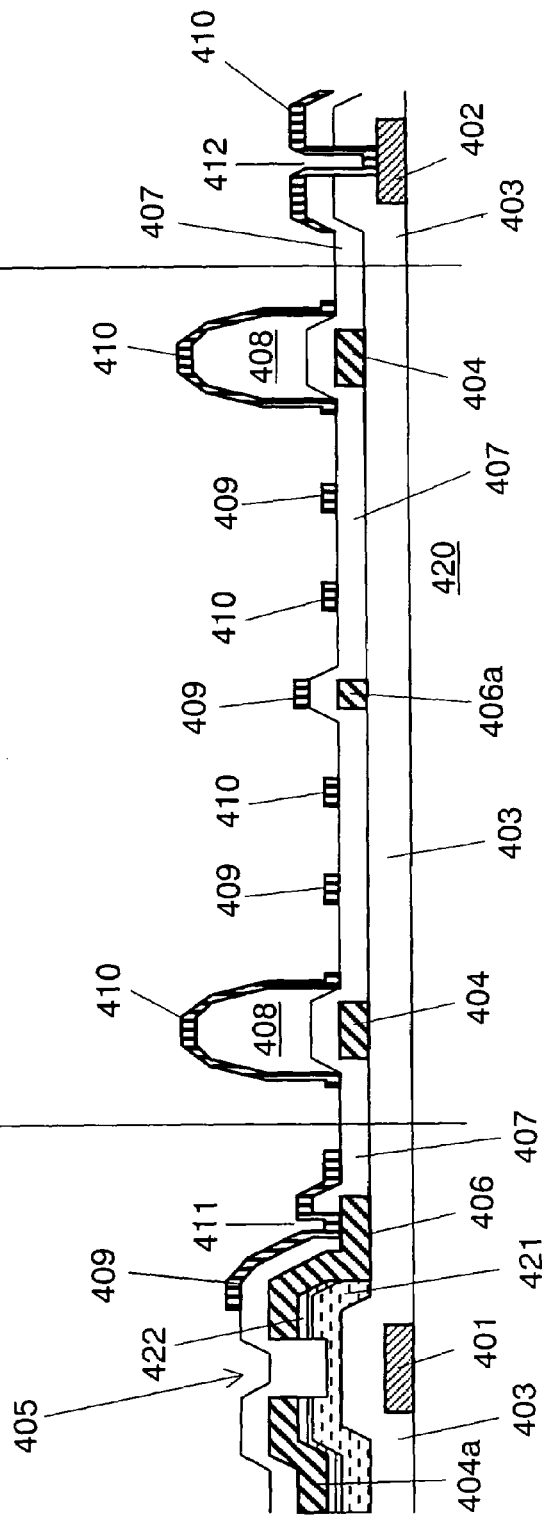
FIGS. 4A to 4C are partial cross-sectional views along the lines IVA-IVA, IVB-IVB, and IVC-IVC in FIG. 3, respectively.
Figure 5:
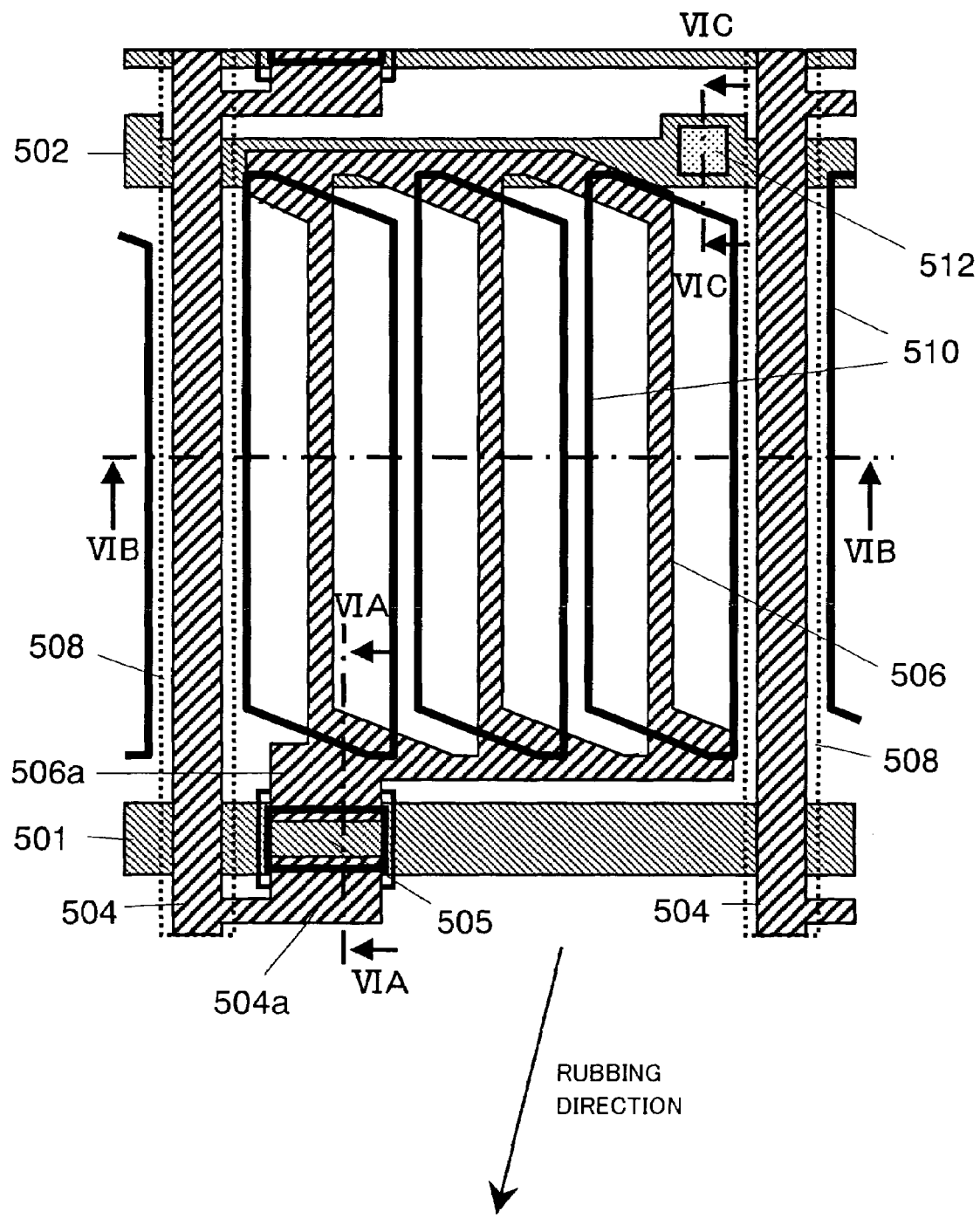
FIG. 5 is a plan view of a third prior-art active-matrix addressing substrate.
Figure 6:
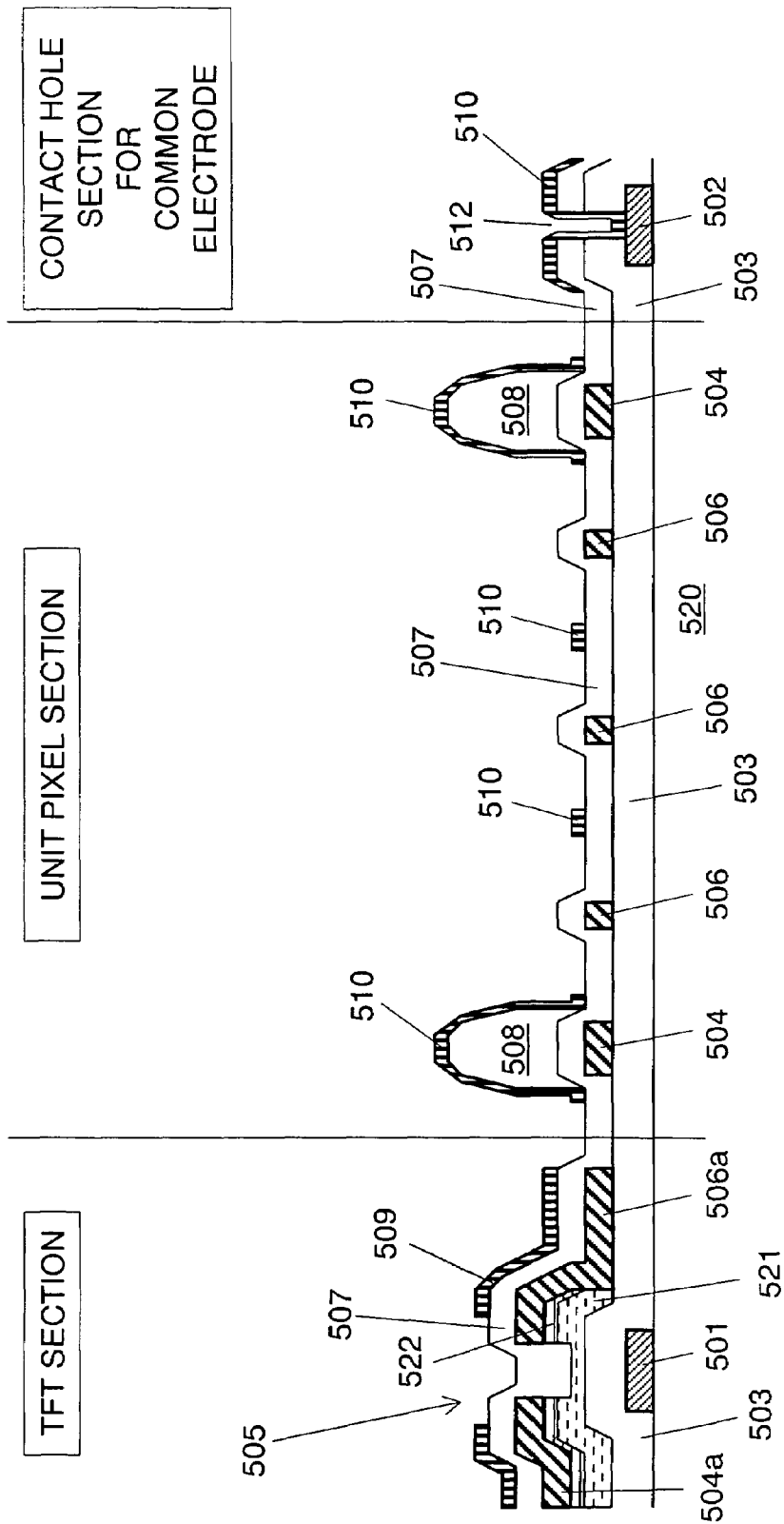
FIGS. 6A to 6C are partial cross-sectional views along the lines VIA-VIA, VIB-VIB, and VIC-VIC in FIG. 5, respectively.
Figure 7:
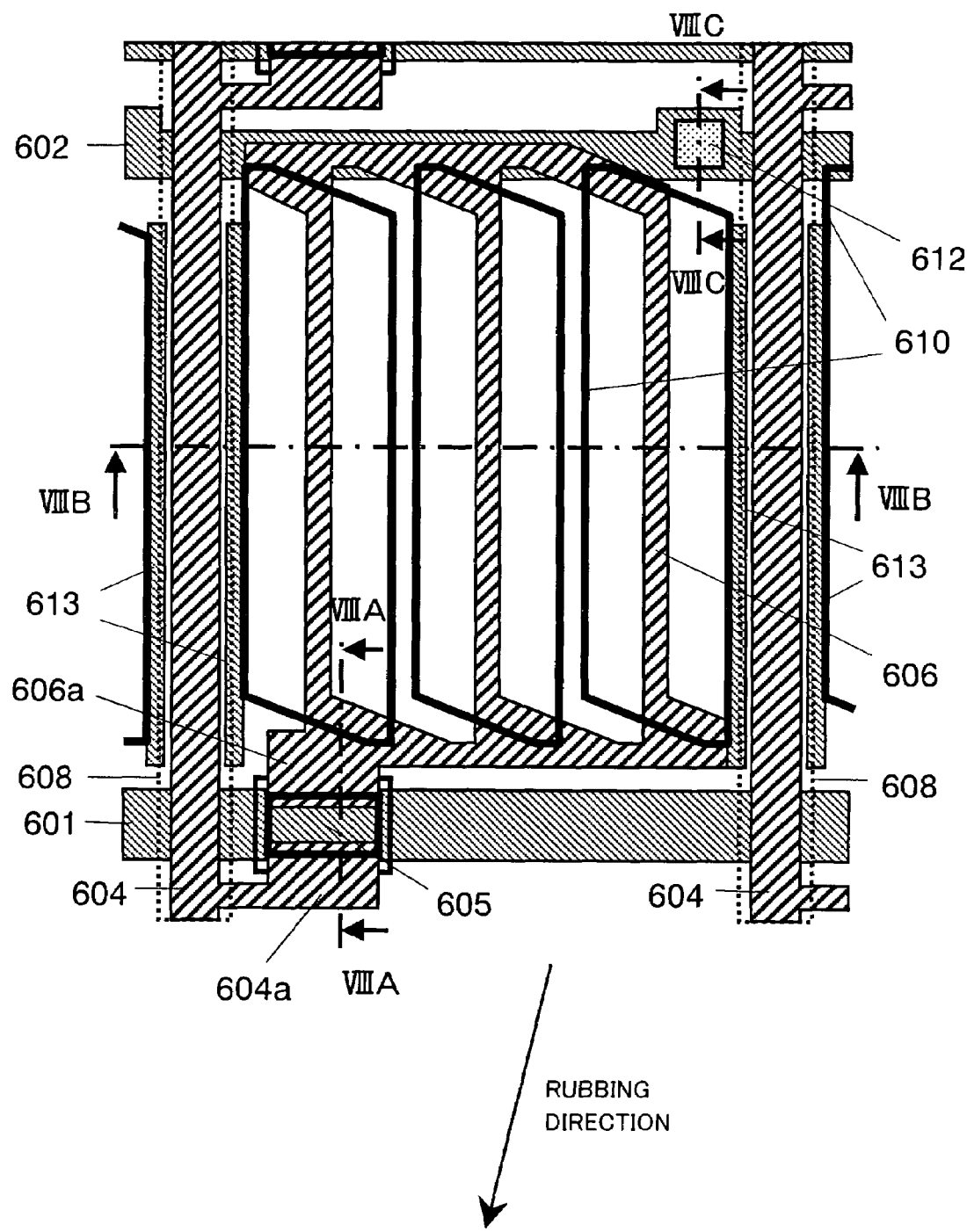
FIG. 7 is a plan view of a first related-art active-matrix addressing substrate.
Figure 8:
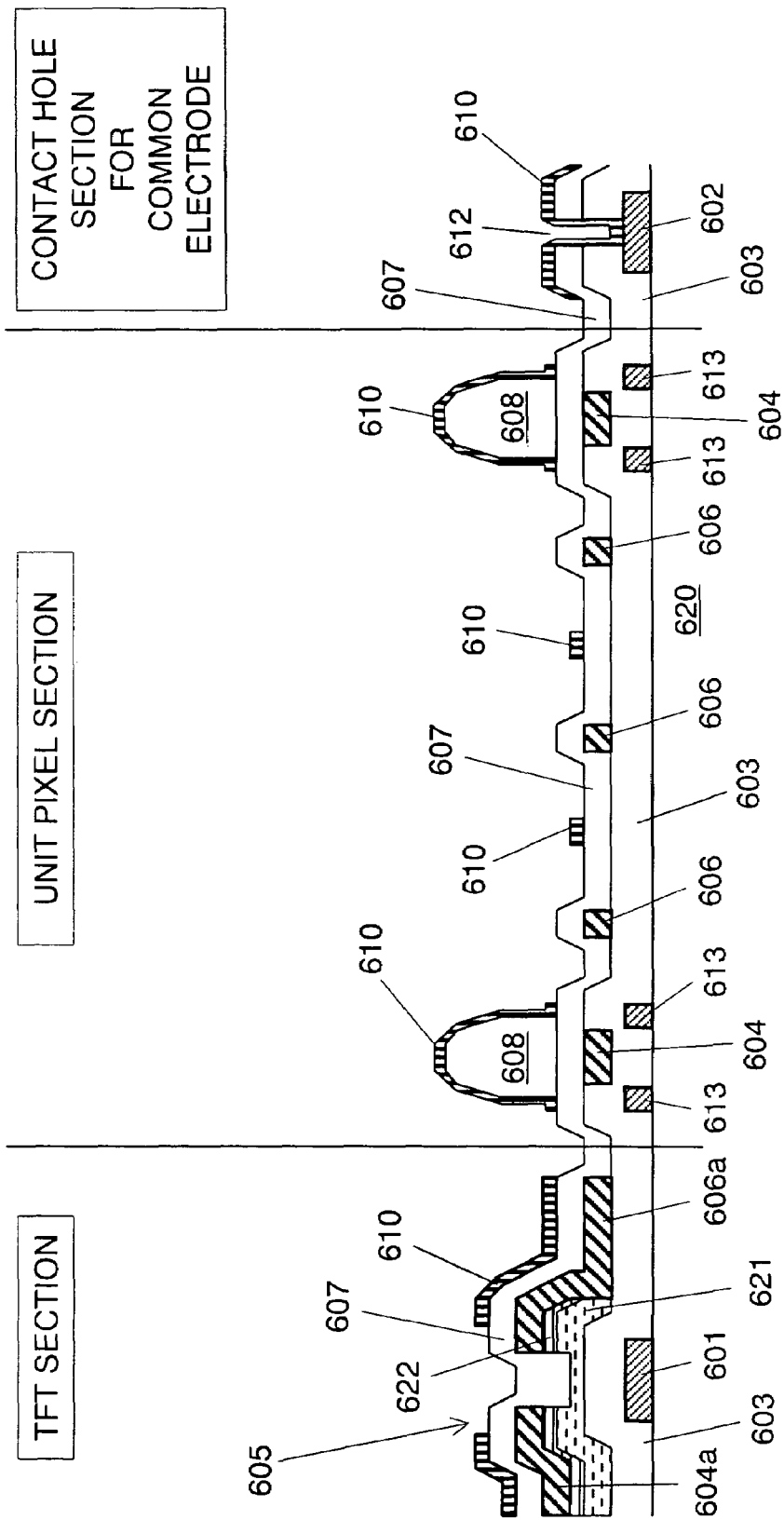
FIGS. 8A to 8C are partial cross-sectional views along the lines VIIIA-VIIIA, VIIIB-VIIIB, and VIIIC-VIIIC in FIG. 7, respectively.

Preferred embodiments of the present invention will be described in detail below while referring to the drawings attached.

First Embodiment

FIGS. 14A to 14C and FIG. 15 show an active-matrix addressing substrate according to a first embodiment of the invention, which is used for an active-matrix addressing LCD device using lateral electric field. These figures show the structure of one of the pixel regions.

The substrate according to the first embodiment is approximately equal to the previously-explained first related-art substrate of FIG. 7 and FIGS. 8A to 8C except that the second insulating layer is formed by a different material in a different way.

Specifically, as shown in FIG. 15 and FIGS. 14A to 14C, the substrate according to the first embodiment comprises scanning signal lines 101 and common signal lines 102, which are extended in parallel to each other on a surface of a transparent glass plate 120. These lines 101 and 102 are formed by patterning a first metal film. Part of each scanning signal line 101 serves as a gate electrode of a corresponding one of TFTs 105.

On the glass plate 120, a pair of linear light-shielding electrodes 113 is additionally provided in the vicinity of each of image signal lines 104. The electrodes 113, which are formed to extend along the said line 104, may be electrically connected to the corresponding common signal lines 102 or electrically isolated. Since the light-shielding electrodes 113 are located on the plate 120, the electrodes 113 are on the same level as the scanning signal lines 101 and the common signal lines 102. The light-shielding electrodes 113 are formed by patterning the first metal film used for the scanning signal lines 101 and the common signal lines 102.

A first insulating layer 103 is formed on the whole plate 120 to cover the scanning signal lines 101, the common signal lines 102, and the light-shielding electrodes 113.

On the first insulating layer 103, for each of the TFTs 105, a patterned a-Si layer 121 and an n-type patterned a-Si layer 122 are formed in this order to be overlapped with a corresponding one of the scanning signal lines 101 in the TFT section. A source electrode 106a and a drain electrode 104a of the TFT 105 are formed to overlap with the corresponding one of the a-Si layers 122.

Image signal lines 104 are formed to be buried in the first insulating layer 103 to extend perpendicular to the scanning signal lines 101 and the common signal lines 102. The image signal lines 104, the drain electrodes 104a, the pixel electrodes 106, and the source electrodes 106a are formed by patterning a second metal film. The drain electrodes 104a are united with the corresponding image signal lines 104, respectively. The source electrodes 106a are united with the corresponding pixel electrodes 106, respectively.

A second insulating layer 107 is formed on the first insulating layer 103 to cover the image signal lines 104, the drain electrodes 104a, the pixel electrodes 106, and the source electrodes 106a over the whole plate 120. Since the pixel electrodes 106 are united with the corresponding source electrodes 106a, contact holes for electrically connecting the pixel electrodes 106 to the corresponding source electrodes 106a are unnecessary.

Figure 9:
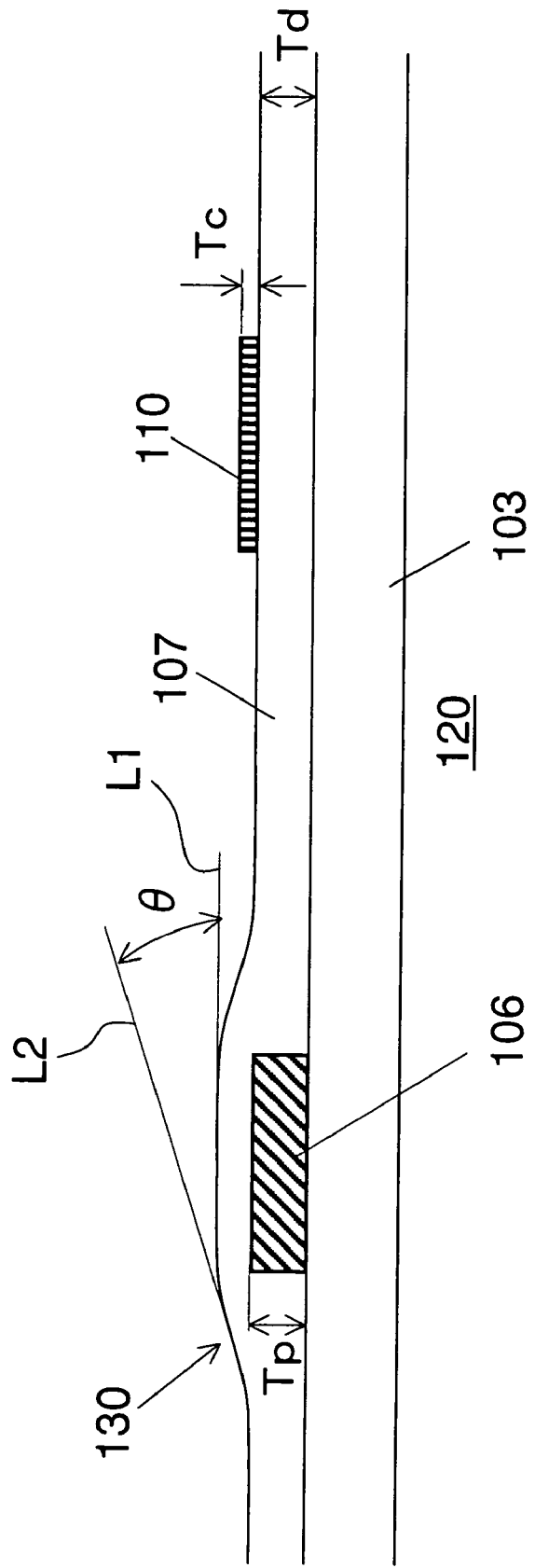
FIG. 9 is a schematic cross-sectional view showing the aperture of the pixel region of an active-matrix addressing substrate according to the present invention.
Figure 15:
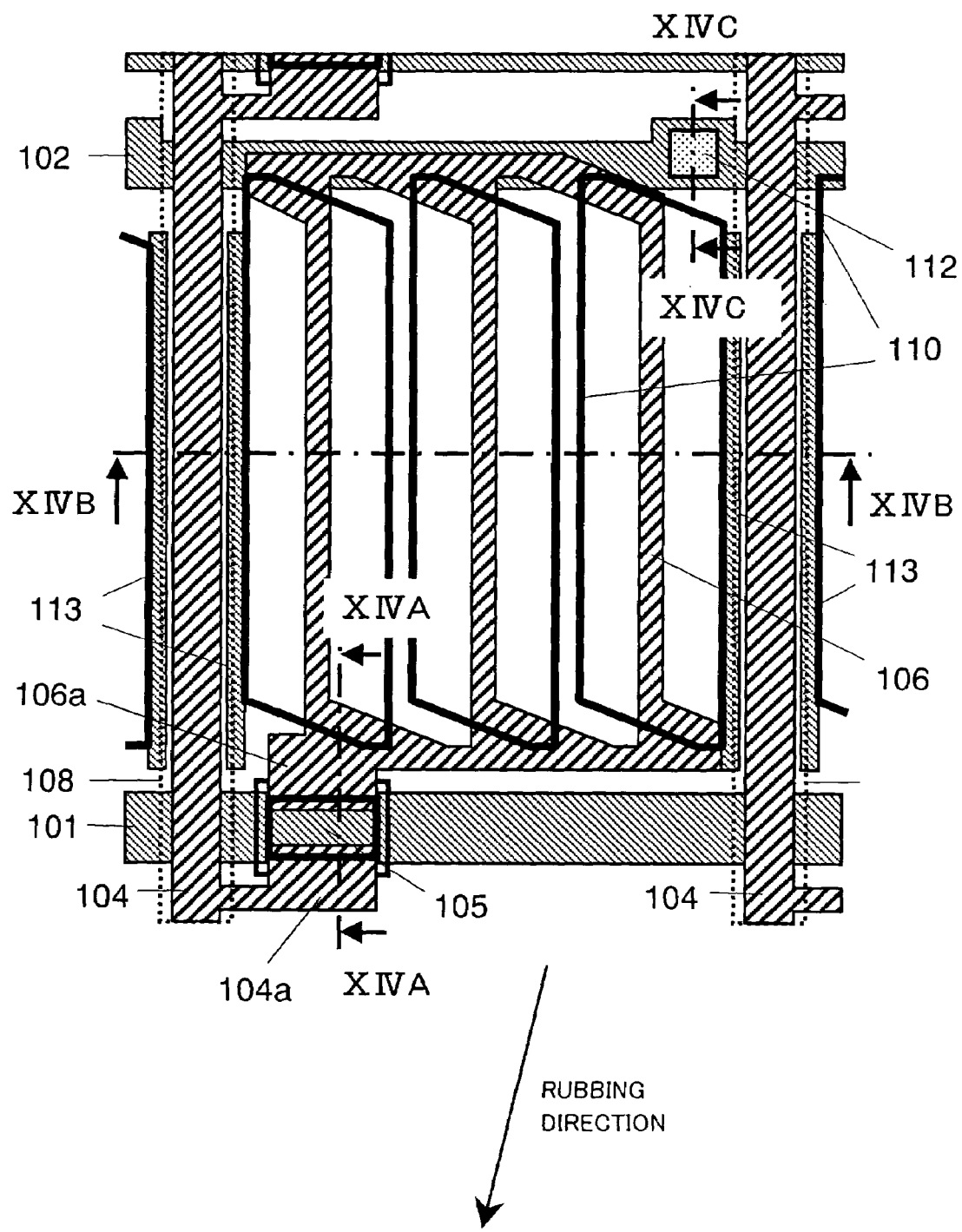
FIG. 15 is a plan view of the active-matrix addressing substrate according to the first embodiment of the invention.

Here, the second insulating layer 107 is made of a cured or hardened dielectric resin, such as a cured acrylic resin. Because such a dielectric resin has fluidity before curing or hardening, it can be formed on the first insulating layer 103 in the form of a layer by a coating process. Therefore, the resultant steps or level differences 130 of the layer 107 near the pixel electrodes 106 are effectively suppressed or relaxed, which means that the steps 130 slope gently, as clearly shown in FIG. 9.

A third insulating layer 108, which is thick, is selectively formed on the second insulating layer 107. The third insulating layer 108 is left to cover only the respective image signal lines 104. The cross section of the layer 108 is like banks that extend along the respective lines 104, as shown in FIG. 14B. A common electrode 110 is formed on the third insulating layer 108 and the exposed part of the second insulating layer 107 by patterning a transparent, conductive material film. Each of the pixel electrodes 109 has comb-teeth-shaped parts, and the common electrode 110 has comb-teeth-shaped parts also. The image signal lines 104 are entirely covered with the common electrode 110 by way of the second and third insulating layers 107 and 108.

The common electrode 110 is contacted with the common signal lines 102 by way of corresponding contact holes 112, respectively. Therefore, the common electrode 110 is electrically connected to the common signal lines 102.

Next, a method of fabricating the substrate according to the first embodiment will be explained below with reference to FIGS. 11A to 14C.

First, as shown in FIGS. 11A to 11C, the first metal film (not shown) is formed on the surface of the glass plate 120 and then, it is patterned to form the scanning signal lines 101, the common signal lines 102, and the linear light-shielding electrodes 113.

Next, the first insulating layer 103 (e.g., a silicon nitride layer) is formed on the whole plate 120 to cover the scanning signal lines 101, the common signal lines 102, and the light-shielding electrodes 113. The state at this stage is shown in FIGS. 11A to 11C.

Next, on the first insulating layer 103 thus formed, an a-Si layer and an n-type a-Si layer are formed in this order and patterned, thereby forming the a-Si layers 121 and the n-type a-Si layers 122 in the TFT section. The first insulating layer 103 is selectively etched at the corresponding positions to the respective image signal lines 104, thereby forming trenches. Thereafter, the second metal film is formed on the first insulating layer 103 and patterned, thereby forming the image signal lines 104, the drain electrodes 104a, the pixel electrodes 106, and the source electrodes 106a. The image signal lines 104 are buried in the corresponding trenches of the first insulating layer 103.

The a-Si layers 121 and 122 are selectively etched to form recesses 130 in the TFT section. The state at this stage is shown in FIGS. 12A to 12C.

Subsequently, to form the second insulating layer 107, an acrylic resin is coated on the first insulating layer 103 by a spin coating process and then, the coated resin layer with a desired thickness is exposed to light, developed, and sintered for curing or hardening. As the acrylic resin, for example, PC 415G manufactured by JSR Corporation may be used. Prior to hardening, such an acrylic resin has high fluidity and therefore, the spin coating process can be carried out easily. Moreover, because such an acrylic resin is used for forming the second insulating layer 107, the gently sloping steps 130 of the layer 107 are formed near the pixel electrodes 106. The state at this stage is shown in FIGS. 13A to 13C.

Following this, the third insulating layer 108 is formed on the second insulating layer 107 and patterned, thereby leaving it to cover only the respective image signal lines 104. Thus, the bank-shaped layer 108 is selectively formed on the second insulating layer 107.

The first and second insulating layers 103 and 107 are selectively etched to form the contact holes 112 for the common electrode 110.

Thereafter, a transparent, conductive film such as an ITO (Indium Tin Oxide) film is formed on the second and third insulating layers 107 and 108, and then patterned, thereby forming the common electrode 107. The common electrode 110 is contacted with the common signal lines 102 by way of corresponding contact holes 112, respectively. The state at this stage is shown in FIGS. 14A to 14C and FIG. 15.

The active-matrix addressing substrate according to the first embodiment is fabricated in the above-described process steps.

With the substrate according to the first embodiment, since the second insulating layer 107 is made of an acrylic resin layer formed by coating an acrylic resin on the first insulating layer 103 and hardening the same, the steps or level differences 130 of the second insulating layer 107 near the pixel electrodes 106 are effectively suppressed or relaxed. Thus, the steps 130 of the layer 107 slope gently, as clearly shown in FIG. 9.

Moreover, since the steps of the second insulating layer 107 slope gently, the steps caused by the common electrode 110 formed on the second insulating layer 107 will slope gently as well.

As a result, the degradation of initial alignment of liquid-crystal molecules caused by the steps or level differences of the pixel electrodes 106 and/or the common electrode 110 is improved. In addition, because of the same reason, the optical leakage in the state of displaying black is suppressed and therefore, higher contrast and higher uniformity can be realized.

On the other hand, with the first related-art substrate of FIG. 7 and FIGS. 8A to 8C, the second insulating layer 207 is made of a silicon nitride film formed on the first insulating layer 203, as shown in FIG. 10. Thus, the step or level difference 230 of the second insulating layer 207 near the pixel electrode 206 is large, which reflects the thickness of the underlying pixel electrode 206. Accordingly, the problem of the optical leakage in the state of displaying black occurs.

Although the second insulating layer 107 is made of an acrylic resin in the first embodiment, any other material may be used for this purpose if it has fluidity high enough for conducting its coating process and has a property that relaxes or suppresses the level differences due to the pixel electrodes 106.

Moreover, the structure of the first embodiment is approximately the same as that of the first related-art substrate of FIG. 7 and FIGS. 8A to 8C. However, the structure of any other active-matrix substrate may be used, if the common electrode 110 is formed above the pixel electrodes 106 by way of the intervening second insulating layer 107. For example, the structure of the third prior-art substrate of FIG. 5 and FIGS. 6A to 6C may be used for the first embodiment.

Second Embodiment

Next, an active-matrix substrate according to a second embodiment of the invention and a method of fabricating the same will be explained below.

The structure and fabricating process steps of the second embodiment are the same as those of the first embodiment. Therefore, explanation about them is omitted here.

The feature of the second embodiment is to define the thickness of the pixel electrodes. This feature is explained below with reference to FIG. 9.

Since the pixel electrode 106 is located on the same level as the image signal line, the thickness Tp of the pixel electrode 106 is equal to that of image signal line. To decrease the height (i.e., the level difference) of the step 130 of the second insulating layer 107, the pixel electrode 106 may be thinned. In this case, however, the writing operation of the image signal is likely to be delayed. Therefore, the thicknesses of the pixel and common electrodes 106 and 110 need to be determined based on the result of balancing the effect of the step 130 and the effect of the delayed writing operation of the image signal.

With the first-related art structure shown in FIG. 10, if the thickness of the pixel electrode 206 is increased, the above-described problem is caused by the step 230; if the thickness of the pixel electrode 206 is decreased, the delayed writing operation of the image signal is generated.

With the structure of the second embodiment, unlike the structure of FIG. 10, the thickness Tp of the pixel electrode 106 can be increased, because the step 130 is sloping gently. According to the inventor's test, the preferred thickness Tp of the pixel electrode 106 is approximately 2000 Å (=200 nm) or greater, where it was confirmed that the delayed writing operation of the image signal could be suppressed.

In this way, by forming the pixel electrode 106 and the image signal line to have the thickness of 200 nm or greater and forming the second insulating layer 107 with a dielectric material having fluidity in the coating process and a function of relaxing the step 130, the step 130 can be relaxed and at the same time, the delayed writing operation of the image signal can be suppressed.

Although the lower limit of the thickness Tp of the pixel electrode 106 is determined here, the upper limit thereof can be determined appropriately according to the fluidity of the dielectric material for the second insulating layer 107, the coating condition, the sintering condition and so on.

Moreover, if the common electrode 110 is formed over the pixel electrodes 106 by way of the intervening second insulating layer 107, the structure of any other active-matrix substrate, for example, the structure of the third prior-art substrate of FIG. 5 and FIGS. 6A to 6C may be applied.

Third Embodiment

Next, an active-matrix substrate according to a third embodiment of the invention and a method of fabricating the same will be explained below.

The structure and fabricating process steps of the third embodiment are the same as those of the first or second embodiment. Therefore, explanation about them is omitted here.

The feature of the third embodiment is to define the thickness of the common electrode. This feature is explained below with reference to FIG. 9.

Since the common electrode 110, which is located on the second insulating layer 107, is formed in different process steps from the common signal line located on the lowest level. Thus, the thickness Tc of the common electrode 110 may be determined separately from that of the common signal line. However, if the common electrode 110 is too thick, the thickness of the alignment layer located over the common electrode 110 is likely to be too small partially. Alternately, the common electrode 110 is likely to be partially exposed from the alignment layer. Thus, the initial alignment effect by the alignment layer will degrade. Therefore, in the third embodiment, to suppress such the degradation of the initial alignment effect, the preferred thickness Tc of the common electrode 110 is defined at approximately 500 Å (=50 nm) or less.

According to the inventor's test, it was confirmed that if the thickness Tc of the common electrode 110 is approximately 50 nm or less, the step or level difference of the common electrode 110 could be absorbed through an ordinary printing process for the alignment layer and therefore, the common electrode 110 was well covered with the alignment layer.

In this way, by forming the second insulating layer 107 with a dielectric material having fluidity in the coating process and a function of relaxing the step 130, and subsequently, forming the common electrode 110 to have a thickness of approximately 50 nm or less, the step 130 can be relaxed and at the same time, the initial alignment degradation can be suppressed.

Although the upper limit of the thickness Tc of the common electrode 110 is defined here, the lower limit thereof can be determined appropriately according to the width of the common electrode, the conductance of the conductive material for the common electrode 110, the mechanical strength of the conductive material, and so on.

Moreover, if the common electrode 110 is formed above the pixel electrodes 106 by way of the intervening second insulating layer 107, the structure of any other active-matrix substrate, for example, the structure of the third prior-art substrate of FIG. 5 and FIGS. 6A to 6C may be used.

Fourth Embodiment

Next, an active-matrix substrate according to a fourth embodiment of the invention and a method of fabricating the same will be explained below.

The structure and fabricating process steps of the fourth embodiment are the same as those of the first, second or third embodiment. Therefore, explanation about them is omitted here.

The feature of the fourth embodiment is to define the thickness of the second insulating layer. This feature is explained below with reference to FIG. 9.

It is apparent that the thicker the second insulating layer 107, the more the relaxation effect for the step 130 due to the pixel electrode 106. However, with the type of the active-matrix addressing substrate according to the invention, the pixel electrode 106 and the common electrode 110 are located in different levels and therefore, the driving voltage is likely to be too high according to the increasing thickness Td of the second insulating layer 107 at its flat or even position. Thus, in the fourth embodiment, the preferred thickness Td of the second insulating layer 107 is defined at approximately 3000 Å (=300 nm) or less, where the thickness Td is set at approximately equal to or greater than the thickness Tp of the pixel electrode.

According to the inventor's test, it is confirmed that if the thickness Td of the second insulating layer 107 is approximately equal to or greater than the thickness Tp of the pixel electrode, the effect by the step 130 of the second insulating layer 107 can be suppressed at a level where substantially no problem occurs due to the step 130. Moreover, if the thickness Td of the second insulating layer 107 is approximately 300 nm or less, the rise of the driving voltage is suppressed to 0.25 V compared with the structure where the pixel electrode 106 and the common electrode 110 are located in the same level, raising no problem practically.

In this way, by forming the second insulating layer 107 with a dielectric material having fluidity in the coating process and a function of relaxing the step 130 to have a thickness of approximately 300 nm or less, the driving voltage increase can be suppressed while relaxing the effect by the step 130.

If the common electrode 110 is formed over the pixel electrodes 106 by way of the intervening second insulating layer 107, the structure of any other active-matrix substrate, for example, the structure of the third prior-art substrate of FIG. 5 and FIGS. 6A to 6C may be used.

Fifth Embodiment

Next, an active-matrix substrate according to a fifth embodiment of the invention and a method of fabricating the same will be explained below.

The structure and fabricating process steps of the fifth embodiment are the same as those of the first, second, third, or fourth embodiment. Therefore, explanation about them is omitted here.

The feature of the fifth embodiment is to define the inclination angle of the second insulating layer. This feature is explained below with reference to FIG. 9.

To completely planarize the step or level difference 130 of the second insulating layer 107 caused by the pixel electrode 106, the thickness Td of the second insulating layer 107 needs to be approximately 10000 Å (=1 µm) or greater, even if the second insulating layer 107 is formed by a dielectric material having high fluidity in the coating process. However, this requirement is not practical. On the other hand, the inventor found that if the inclination angle θ of the step 130 is small, the effect by the step 130 can be suppressed at a level where substantially no problem occurs without completely planarizing the step 130. Here, the inclination angle θ is defined as an angle between the tangent L1 at the top of the step 130 and the tangent L2 on the side face of the step 130.

Accordingly, in the fifth embodiment, the preferred inclination angle θ of the step 130 of the second insulating layer 107 is defined at approximately 30° or less. According to the inventor's test, if the preferred inclination angle θ is approximately 30° or less, the optical leakage due to the alignment degradation scarcely affects the black luminance.

In this way, by forming the second insulating layer 107 with a dielectric material having fluidity in the coating process and a function of relaxing the step 130 to have an inclination angle of approximately 30° or less, the effect by the step 130 due to the pixel electrode 106 can be suppressed.

If the common electrode 110 is formed over the pixel electrodes 106 by way of the intervening second insulating layer 107, the structure of any other active-matrix substrate, for example, the structure of the third prior-art substrate of FIG. 5 and FIGS. 6A to 6C may be applied.

Other Embodiments

It is needless to say that the present invention is not limited to the above-described first to fifth embodiments and their variations. Any other modification is applicable to these embodiments and variations.

For example, with the above-described first to fifth embodiments of the invention, the invention is applied to an active-matrix addressing substrate used for the active-matrix addressing LCD device using lateral electric field. However, the invention is applicable to any other type of the LCD device and any organic EL (ElectroLuminescence) display device.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A method of fabricating an active-matrix addressing substrate, comprising:
    forming scanning signal lines and common signal lines one of on and over a transparent plate;
    forming a first insulating layer one of on and over the plate to cover the scanning signal lines and common signal lines;
    forming image signal lines and pixel electrodes on the first insulating layer;
    forming a second insulating layer on the first insulating layer by depositing a dielectric material having fluidity prior to hardening to cover the image signal lines and the pixel electrodes, said second insulating layer comprising gently sloping steps;
    forming a patterned third insulating layer on the second insulating layer to selectively cover the image signal lines; and
    forming a common electrode on the third insulating layer.

2. The method according to claim 1, wherein the dielectric material having fluidity prior to hardening comprises an acrylic resin.

3. A method of fabricating an active-matrix addressing substrate, comprising:
    forming scanning signal lines, common signal lines, and light-shielding electrodes one of on and over a transparent plate;
    forming a first insulating layer one of on and over the plate to cover the scanning signal lines, the common signal lines, and the light-shielding electrodes;
    forming image signal lines one of on and in the first insulating layer to be overlapped to correspond with the light-shielding electrodes;
    forming pixel electrodes on the first insulating layer;
    forming a second insulating layer on the first insulating layer by depositing a dielectric material having fluidity prior to hardening to cover the image signal lines, the pixel electrodes, and the light-shielding electrodes, said second insulating layer comprising gently sloping steps;
    forming a patterned third insulating layer on the second insulating layer to selectively cover the image signal lines; and
    forming a common electrode on the third insulating layer.

4. The method according to claim 3, wherein the dielectric material having fluidity prior to hardening comprises an acrylic resin.

5. The method according to claim 1, wherein one of a flat position and an even position of said second insulating layer is approximately equal in thickness to the pixel electrodes, and
    wherein one of the flat position and the even position of the second insulating layer comprises a thickness of approximately 300 nm or less.

6. The method according to claim 1, wherein one of a flat position and an even position of said second insulating layer is approximately equal in thickness to the pixel electrodes, and
    wherein the second insulating layer comprises an inclination angle of approximately 30° or less near respective portions of the pixel electrodes.

* * * * *